Oct. 6, 1959  E. F. WRIGHT ET AL  2,907,609
CROSSHEAD GUIDE ASSEMBLY
Filed Nov. 18, 1955

ELLIOTT F. WRIGHT
RALPH M. WATSON
ANTHONY J. LARRECQ
INVENTORS

BY Daniel H. Bobis
Atty

United States Patent Office 2,907,609
Patented Oct. 6, 1959

2,907,609
CROSSHEAD GUIDE ASSEMBLY

Elliott F. Wright, Plainfield, N.J., Ralph M. Watson, Syracuse, N.Y., and Anthony J. Larrecq, Yardley, Pa., assignors, by direct and mesne assignments, to Worthington Corporation, Harrison, N.J., a corporation of Delaware Application November 18, 1955, Serial No. 547,757

2 Claims. (Cl. 308—3)

The present invention relates to a crosshead guide assembly and more particularly to an adjustable crosshead guide.

In a reciprocating pump in which a plunger is disposed in a cylinder for reciprocation therein to displace a fluid, the plunger is provided with a packing assembly to prevent leakage of the fluid out of the cylinder around the plunger. To insure the best operation of the packing assembly about the plunger in the pump cylinder it is important that the plunger should reciprocate in a straight line without vibrating laterally in the cylinder against the packing assembly to avoid excessive wear or breakage of the packing which necessitates frequent replacing thereof.

However, a perfectly straight motion cannot be obtained in a pump with a conventional system of crosshead guides because a running clearance must be left between the crosshead and guides. This clearance is necessary because the side thrust of the crosshead against the guides is reversed every revolution of the crankshaft.

The running clearance will depend on the accuracy of machining of the crosshead guides and will increase as the machine wears permitting a certain amount of lateral vibration of the crosshead. Since the plunger is actuated by the crosshead, the plunger will also vibrate laterally against its packing assembly in the cylinder.

In accordance with the present invention, an adjustable crosshead guide assembly is provided consisting of one rigidly mounted slide or guide and one spring loaded slide. The guided crosshead is pushed by the spring loaded slide against the rigidly mounted slide. The main side thrust of the crosshead is directed against the rigidly supported slide. During the pump suction stroke, this thrust is reversed, but is of small magnitude and can easily be resisted by the spring loaded slide. Therefore, the guidance of the plunger is improved because there is no necessity of having a running clearance between the crosshead and slides and no side slapping is apt to occur.

The present invention further provides an adjustable crosshead guide assembly which simplifies the machining of the crosshead and crosshead guide with respect to one another by eliminating the need of a running clearance between these parts.

The invention will be better understood from the following description when considered in connection with the accompanying drawing forming a part thereof and in which—

Figure 1:
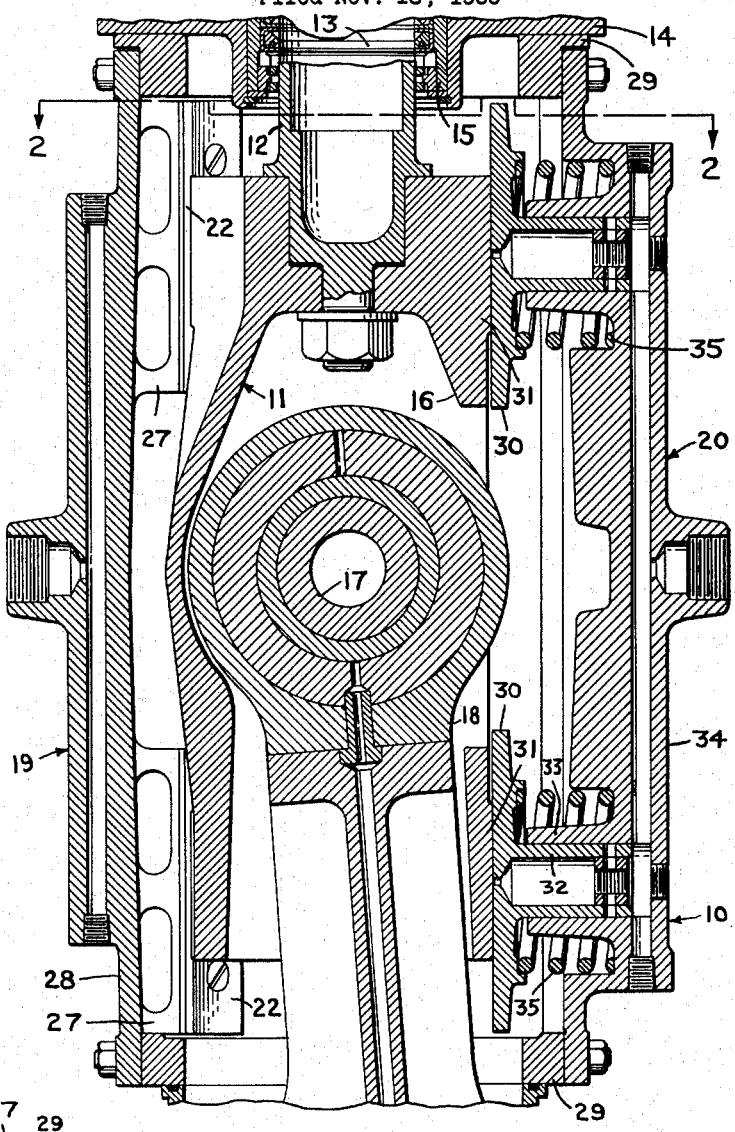
Figure 2:
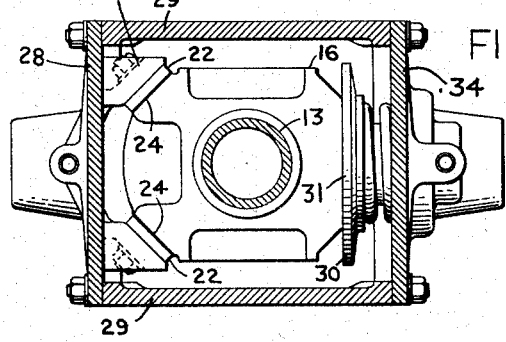

Figure 1 is a fragmentary longitudinal section of the crosshead guide assembly embodied in the present invention, and Figure 2 is a section, on a reduced scale taken on lines 2—2 of Figure 1.

Referring to the drawings, the reference numeral 10 designates the crosshead guide assembly of a reciprocating pump. A crosshead 11 is disposed for slidable movement in the crosshead guide assembly. A plunger 12 is connected to the crosshead and is slidably disposed within a cylinder 13 formed in a cylinder housing 14. Plunger 12 is provided with a packing assembly 15 for preventing the leakage of fluid around the plunger and out of the cylinder.

The crosshead 11 comprises an elongated hollow piston or body 16 provided with a horizontal wrist pin 17 mounted therein. A connecting or eccentric rod 18 is arranged on pin 17 and is driven by a crankshaft, not shown, to reciprocate the crosshead 11 within the crosshead guide assembly 10.

The crosshead guide assembly 10 comprises a rigidly mounted guide member 19 and a spring loaded guide member 20 disposed on opposite sides of the crosshead 11.

Guide member 19 comprises longitudinally extending diagonal slides for bearing faces disposed adjacent the end portions of the crosshead 11 and adapted to slidably engage the diagonal face portions 24 on the crosshead. Slides 22 form a right angle with one another to provide a V-shaped guide for the crosshead faces 24 of the crosshead. Slides 22 are connected to struts 27 fixed to a cover plate 28 which is connected to the pump frame 29.

Crosshead guide member 20 comprises longitudinally extending slides 30 disposed adjacent the end portions of the crosshead 11 in alignment with slides 22 and adapted to slidably engage side faces 31 of the crosshead. A laterally extending sleeve 32 is provided on each slide 30 and is adapted to slidably extend into an outer sleeve 33 formed on a cover plate 34. A compression spring 35 is mounted on each outer sleeve 33 and is adapted to force slide 30 in engagement with the adjacent side face 31 of the crosshead to maintain the guide member in engagement with the side of the crosshead.

In operation, when the crankshaft, not shown, is rotated, connecting rod 18 will slide the crosshead body 16 in one direction in the crosshead guide assembly 10 and then in the opposite direction, and the crosshead body 16 in turn will actuate the plunger 12 in the same direction in the packing assembly 15. During the discharge or power stroke, the plunger 12 moves upwardly in the cylinder, looking at Figure 1, and the crosshead body 16 develops a side thrust in a direction toward cover plate 28 so that body 16 is thrown against guide member 19 as it reciprocates within the crosshead guide assembly. During this movement, the guided crosshead body 16 is pushed by the spring loaded guide member 20 against the rigidly mounted slide or guide member 19 so that the crosshead body will maintain a straight line motion or movement without any lateral vibrations or side-slapping of the crosshead body against the crosshead guide members. Since plunger 12 is rigidly connected to the crosshead body, it, too, will maintain a straight line movement as it slides in packing assembly 15 and thus will insure the best operation of the packings without any side-slapping thereof by the plunger to produce excessive wear on the packing.

When the plunger has reached its full stroke it will return in the cylinder in the opposite direction. During this period, the crosshead body 16 will develop a side thrust against the adjustable guide members 20. However, the side thrust in this opposite direction is comparatively small and can be resisted by the springs 35, since the force moving the connecting rod 18 is inertia, and the crosshead body will slidably engage the crosshead guide assembly as it moves in an opposite direction without any lateral vibrations or side-slapping against the crosshead guide members. Thus, the present invention provides a self-adjustable crosshead guide assembly which will prevent any lateral vibrations of the crosshead body and plunger, during reciprocation of the crosshead body and plunger, and which eliminates the need for a running clearance between the crosshead body and the crosshead guide members.

It will be understood that the invention is not to be limited to the specific construction or arrangement of parts shown but that they may be widely modified within the invention defined by the claims.

What is claimed is:

1. A crosshead guide assembly comprising a first guide member, a second guide member disposed laterally of said first member and in spaced relation therewith, plural slide members mounted on one of said guide members and comprising flat bearing plates forming a V-shaped angle with respect to one another, a crosshead body disposed between said guide members in slidable engagement with said flat bearing plates, and a second slide member mounted on the other of said guide members, said second slide member comprising a plate disposed transversely of said crosshead body and including lateral female sleeves, a laterally extending slide having lateral male sleeves disposed in said lateral female sleeves and compression means mounted about said lateral female sleeves for maintaining said laterally extending slide in abutment with said crosshead body.

2. A crosshead guide assembly comprising a first guide member, a second guide member disposed laterally of said first member and in spaced relation therewith, plural slide members fixedly mounted on one of said guide members and comprising bearing plates, a crosshead body disposed between said guide members in slidable engagement with said bearing plates, and a second slide member mounted on the other of said guide members, said second slide member comprising a plate disposed transversely of said crosshead body and including lateral female sleeves, a laterally extending slide having lateral male sleeves disposed in said lateral female sleeves and compression means mounted about said lateral female sleeves for maintaining said laterally extending slide in abutment with said crosshead body.

References Cited in the file of this patent

UNITED STATES PATENTS

| | | |
|---|---|---|
| 588,651 | McNamara | Aug. 24, 1897 |
| 632,001 | Stumpf | Aug. 29, 1899 |
| 722,900 | Reilly | Mar. 17, 1903 |
| 957,920 | Wassmann | May 17, 1910 |
| 1,178,555 | Thomson | Apr. 11, 1916 |
| 1,285,628 | Craley | Nov. 26, 1918 |
| 1,856,359 | Stanton | May 3, 1932 |
| 2,239,853 | Louree | Apr. 29, 1941 |
| 2,510,377 | Carr | June 6, 1950 |